UNITED STATES PATENT OFFICE

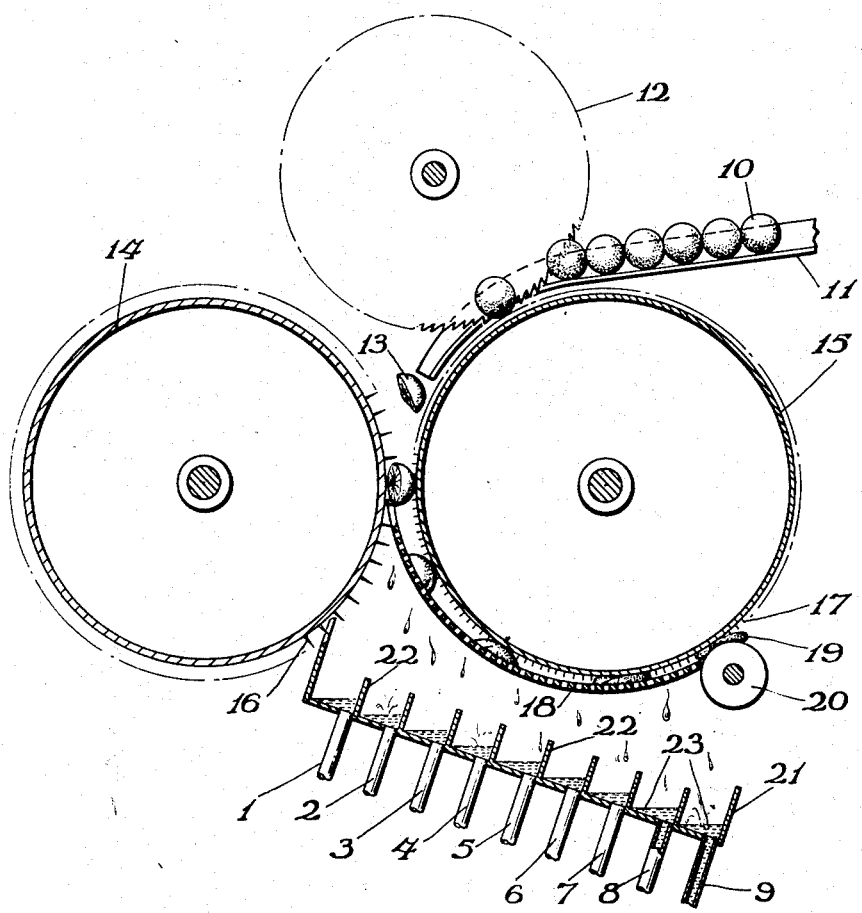

2,608,486

EXTRACTION OF CITRUS JUICE

Wilhelm Paul Arndt, North Hollywood, Calif., assignor to General Foods Corporation, New York, N. Y., a corporation of Delaware Application January 11, 1951, Serial No. 205,533

11 Claims. (Cl. 99—105)

The present invention relates to an improved process for extracting juice from citrus fruit, and more particularly to a process for the selective extraction of juice fractions which contain desired and predetermined but different proportions of particular juice constituents such as sugars, acid, enzymes, peel oil, pulp, pectin, and glucosides or other bitter principles.

The mechanical extraction of juice from citrus fruits generally yields not only the pure juice contained in the juice sacs of the fruit segments, but also in admixture therewith tissue fluids which contain various other undesirable constituents of the fruit. For example, mechanical extractors of the reamer or burr type extract little or no peel oil along with the juice, but the maceration of the pulpy part of the fruit results in an undesirably large proportion of enzymes, pectin, seeds, pulp, and glucosides or other bitter principles being admixed with the juice. Similar difficulties are encountered with other types of extracting machines operating on the principle of simple compression of the fruit, which not only squeeze out a considerable portion of such tissue fluids from the albedo but also the oil from the peel. Screening of the juice separates coarse particles of foreign materials, such as rag, seeds and portions of the carpellary membrane, but does not remove fine particles or dissolved or liquid impurities. Hence where juice of high quality is desired, it has been a common practice to limit the extent of reaming or of compression in order to keep the amount of impurities in the juice within acceptable limits, at the expense of a sizable decrease in the yield of juice obtained.

Furthermore, it is well known that the composition of the juice of citrus fruit varies materially with differences in the variety of the fruit, its maturity, and the conditions under which it is grown such as the season, the amount of rainfall, and the like. Such variations in composition impose undesirable limitations on the processor. For example, one of the commercial standards for orange and grapefruit juices is that the Brix/acid ratio of the juice must not be less than a prescribed minimum value, as explained more fully hereinafter. Since the sugar content of the juice of immature fruit is generally low, juice from immature fruit frequently cannot be used unless stored and subsequently blended with juice from riper fruit to provide a commercially acceptable juice, and picking of immature fruit therefore is avoided as much as possible. Moreover, since the fruit ripens slowly in the early stages of the growing season, the start of the processing season is unduly delayed, whereas on the other hand juice from very ripe fruit at the end of the growing season is apt to be too sweet for many purposes. These factors have undesirably curtailed the processing season which has been limited to that part of the growing season during which the fruit coming into the plant yields juice the average composition of which conforms to the standards of the industry.

In practice the juice produced by mechanical extraction is a composite of the juice of many fruits which contains the combined undesirable materials extracted from the fruit and not separated by screening. This composite juice is used to prepare various citrus juice products, such as canned single-strength juice, frozen single-strength juice, frozen concentrate, so-called "cut back" juice used in preparing frozen concentrate, beverage bases or syrups which are used in the preparation of soft drinks, and the like. The presence in the composite juice of matter such as pectin, pulp, enzymes, peel oil, and glucosides and other bitter principles causes deleterious effects when the juice is used in making some of these products, but is not objectionable in making other products as set forth hereinafter. Thus it is desirable to divide the composite juice into fractions containing different proportions of such undesirable materials for use in making different citrus juice products. Heretofore, however, the composition of the composite juice has not been subject to control except by limiting the extent of extraction with consequent loss of yield.

It is an object of the invention to provide an improved process of citrus juice extraction in which separate juice fractions can be obtained which contain selected amounts of enzymes, pulp, pectin, glucosides or other bitter principles and Brix/acid ratio.

Another object is to increase the yield of juice of acceptable quality which can be extracted from citrus fruits.

Another object is to provide an improved process for extracting citrus juice of predetermined composition which can be used to make citrus juice products of substantially constant uniform quality.

A further object is to provide an improved process for extracting citrus juices such that frozen concentrates can be prepared therefrom in the early and late part of the season that are comparable in composition to those produced during the optimum season.

A still further object is to provide an improved process for extracting citrus fruit juices which can be used to prepare frozen concentrates having little or no tendency to separate out or gel.

Still another object is to provide citrus juice of predetermined composition.

It has been found that when citrus juice is extracted by compression of the fruit, the composition of the juice expressed at different degrees of compression varies materially in its content of constituents such as sugars, acid, enzymes, peel oil, pulp, pectin, and glucosides and other bitter principles. Such variations in composition are not apparent when the juice is collected as a composite which has an average content of the above constituents, but if progressively and preferably gradually increasing pressure be applied to the fruit and the juice be analyzed at various points in the course of compression, it will be found that there is a progressive variation in the proportions of the aforesaid constituents contained in the successive juice fractions. Accordingly juice fractions separately collected at different stages of compression of the fruit will vary in composition, and by properly selecting the limits of such stages, juice fractions can be obtained which contain predetermined but different proportions of particular juice constituents.

The extraction apparatus used to express the juice from the fruit may be of any suitable type. Preferably the fruit is caused to move progressively through an extraction zone throughout which the degree of compression of the fruit is progressively increased, and juice fractions are collected separately from successive sections or parts of said zone, the extent and location of said sections being selected and varied as may be required to obtain fractions of the desired composition. By way of illustration, the drawing shows diagrammatically an extraction apparatus of the well known "Citro-Mat" type disclosed and claimed in U. S. Patent No. 2,212,066. The fruit 10 moves down a suitable feed trough 11 to a rotating cutter or knife 12 which divides each fruit into halves 13. These halves pass between drums 14 and 15, the drum 14 having spikes 16 and the drum 15 having pins 17 which engage the fruit halves and feed them to a perforated screen 18. As shown, the screen is eccentric with respect to the drum 15 to provide between them a passage of gradually decreasing width, the fruit halves traveling along this passage being subjected to gradually and progressively increasing pressure as they pass over the screen. The extracted fruit hulls are discharged at 19 over a suitable separating roll 20.

The juice expressed from the fruit halves drains through the screen 18 by gravity and falls into a collecting pan 21. Any suitable means can be employed for dividing the length of the pan 21 into any desired number of fractional parts of any suitable length as explained hereinafter, and for varying the extent and location of these fractional parts in conformity with variations in the fruit being extracted and in the composition of the fractions that it is desired to obtain. In the form shown, a plurality of stationary dividers or partition walls 22 are employed so that the expressed juice collects in a series of pockets 23 having individual outlets. By suitable combinations of these outlets, the total length of the pan 21 can be divided into the desired number and location of fractional parts or sections. As shown, nine pockets 23 are provided, their outlets being consecutively numbered from 1 to 9 to correspond with the analyses in the tables set forth below.

For purposes of example, the following tables show the composition of the nine juice fractions collected in the pockets 23 by extraction of late season California winter navel oranges, late season California Valencia oranges, mid-season Florida oranges, and Florida grapefruit:

TABLE I

*California navel oranges*

| Pan Sec. No. | Percent of Total Juice | °Brix | Percent Anhy. Citric Acid | Brix/Acid Ratio | Ascor. Acid mg./100 ml. | Percent Oil | Pectin-esterase Content |
|---|---|---|---|---|---|---|---|
| 1 | 2.9 | 12.3 | 1.33 | 9.2 | 59.6 | .094 | 20.0 |
| 2 | 3.2 | 12.3 | 1.35 | 9.1 | 59.2 | .045 | 18.8 |
| 3 | 12.3 | 12.5 | 1.33 | 9.4 | 59.6 | .021 | 18.8 |
| 4 | 12.1 | 12.3 | 1.29 | 9.5 | 59.1 | .013 | 17.2 |
| 5 | 11.3 | 12.5 | 1.25 | 10.0 | 60.4 | .014 | 17.8 |
| 6 | 15.8 | 12.7 | 1.21 | 10.5 | 61.8 | .019 | 25.0 |
| 7 | 16.2 | 12.8 | 1.15 | 11.1 | 63.9 | .016 | 22.5 |
| 8 | 13.8 | 12.8 | 1.15 | 11.1 | 63.7 | .077 | 25.0 |
| 9 | 12.6 | 12.4 | 1.12 | 11.1 | 64.5 | .088 | 29.4 |

TABLE II

*California Valencia oranges*

| Pan Sec. No. | Percent of Total Juice | °Brix | Percent Anhy. Citric Acid | Brix/Acid Ratio | Percent Oil |
|---|---|---|---|---|---|
| 1 | 1.0 | 14.1 | 1.30 | 10.8 | .080 |
| 2 | 2.2 | 14.1 | 1.30 | 10.8 | .055 |
| 3 | 18.0 | 14.5 | 1.30 | 11.1 | .030 |
| 4 | 23.9 | 14.7 | 1.25 | 11.8 | .020 |
| 5 | 11.6 | 14.7 | 1.25 | 11.8 | .010 |
| 6 | 13.5 | 14.8 | 1.20 | 12.3 | .060 |
| 7 | 11.3 | 14.8 | 1.20 | 12.3 | .098 |
| 8 | 9.4 | 14.8 | 1.20 | 12.3 | .160 |
| 9 | 8.7 | 14.5 | 1.30 | 11.1 | .120 |

TABLE III

*Florida Oranges*

| Pan Sec. No. | Percent of Total Juice | °Brix | Percent Anhy. Citric Acid | Brix/Acid Ratio | Percent Oil | Pectin-esterase Content |
|---|---|---|---|---|---|---|
| 1 | 8.3 | 11.9 | 0.99 | 12.0 | 0.081 | 13.1 |
| 2 | 8.3 | 11.9 | 0.98 | 12.2 | 0.022 | 16.7 |
| 3 | 20.6 | 12.1 | 0.97 | 12.5 | 0.017 | 16.0 |
| 4 | 15.1 | 12.2 | 0.92 | 13.2 | 0.013 | 13.9 |
| 5 | 11.25 | 12.2 | 0.88 | 14.0 | 0.027 | 16.4 |
| 6 | 15.2 | 12.3 | 0.80 | 15.5 | 0.041 | 17.2 |
| 7 | 7.35 | 12.5 | 0.73 | 17.1 | 0.073 | 25.9 |
| 8 | 10.55 | 12.3 | 0.77 | 15.9 | 0.11 | 24.1 |
| 9 | 3.43 | 12.3 | 0.82 | 15.0 | 0.17 | 24.1 |

TABLE IV

*Florida Grapefruit*

| Pan No. | Percent Total Juice | °Brix | Percent Anhy. Citric Acid | Brix/Acid Ratio | Percent Oil | Pectin-esterase Content |
|---|---|---|---|---|---|---|
| 1 | 14.2 | 10.2 | 1.76 | 5.8 | 0.012 | 5.4 |
| 2 | 5.9 | 10.4 | 1.74 | 6.0 | 0.007 | 6.0 |
| 3 | 18.6 | 10.3 | 1.72 | 6.0 | 0.002 | 6.9 |
| 4 | 22.9 | 10.4 | 1.73 | 6.0 | 0.001 | 7.2 |
| 5 | 9.8 | 10.4 | 1.59 | 6.5 | 0.004 | 7.7 |
| 6 | 8.3 | 10.4 | 1.55 | 6.7 | 0.005 | 9.4 |
| 7 | 4.9 | 10.3 | 1.54 | 6.7 | 0.012 | 9.6 |
| 8 | 7.1 | 10.9 | 1.56 | 6.7 | 0.031 | 10.4 |
| 9 | 8.3 | 10.9 | 1.58 | 6.5 | 0.050 | 10.4 |

The data in the above tables clearly shows the progressive variation of the proportion of the various juice constituents in the successive juice fractions, and also that similar variations are encountered with different varieties and kinds of citrus fruit. Other citrus fruits such as lemons, limes, tangerines and the like also exhibit progressive variations in the proportions of various juice constituents found in successive juice fractions produced in the manner described above.

In the practical use of the invention, the number of fractions and the combination thereof will depend on the intended uses of the juice, as well as on the varying composition of the fruit, and may be changed from time to time to suit conditions. As an illustration, consider the control of Brix/acid ratio. Citrus juice contains in solution mainly sugars with smaller amounts of organic acids, chiefly citric, some soluble mineral matter, and other soluble materials such as vitamins, glucosides, enzymes, etc., these dissolved substances collectively constituting the "total soluble solids" of the juice and commonly being evaluated on the Brix scale. Acidity, on the other hand, can be determined by titration with 0.1 N NaOH in terms of citric acid. The ratio of total soluble solids to acidity, or Brix/acid ratio, is the so-called "maturity ratio" which is customarily used in the citrus industry to define maturity standards which vary with different citrus products in which the juice is used. For instance, in Florida a minimum ratio of 8:1 is the standard set for oranges, while a minimum ratio of 12:1 is set for frozen concentrated orange juice. Adjustment of the composition of the juice to meet such standards by the addition of ingredients such as sugar is generally prohibited.

When the total juice is used in making frozen orange juice concentrate, the processing season is limited to those periods when fruit is available of the proper variety and degree of maturity to produce a total juice meeting the prescribed standards. As will be seen from Table III, the juice from the Florida midseason oranges tested had an average Brix/acid ratio substantially above the Florida standard and would produce a frozen concentrate sweeter than necessary. Ripe oranges of the same variety would be still sweeter at the end of the growing season (compare Table V). On the other hand, the average Brix/acid ratio for immature fruit would be substantially less, especially in the early stages of the growing season, and might fall below the minimum standard so that the total juice could not be used for making frozen concentrate even though the Brix/acid ratio of the juice fractions from the higher numbered outlets of the extractor might be satisfactory.

The present invention permits control of the sweetness of the product and utilization of such juices to maximum advantage, as well as processing earlier in the season than is possible under the above conditions. For example, the combination of fractions 2, 3 and 4 of Table IIII comprises 44% of the total juice at a Brix/acid ratio of about 12.7 which is well suited for making frozen orange juice concentrate. Thus the juice from these three outlets may suitably be discharged through a common line to the concentration apparatus or to storage for later use for this purpose. On the other hand, the combination of fractions 5, 6 and 7 of Table III comprises 34% of the total juice having a Brix/acid ratio of about 15.4 which is higher than desirable for frozen concentrate. Similarly juice from earlier and/or less mature oranges having a lower average Brix/acid ratio, even though below 12.0, can be divided into fractions having a ratio of about 12.5 which is satisfactory for frozen concentrate, and other fractions having a ratio substantially below 12.0 which can be used for other purposes or blended in appropriate amounts with high ratio fractions such as 5, 6 and 7 of Table III to provide a blend having a ratio of about 12.5. Further a juice in which the Brix/acid ratio of all fractions is less than 12.0 can be blended with high ratio fractions to provide a composite suitable for concentrate. For example, juice corresponding to fractions 3–7 of Table I can be blended in about equal amounts with a juice corresponding to fractions 5–7 of Table II to provide a composite juice having a Brix/acid ratio of about 12.4.

The above tables show only the results obtained with particular lots of fruit, and as stated above the juice extracted from various lots often differs substantially in its average content of the several constituents. That is, even assuming the same variety and maturity of fruit, the composition of its juice will nevertheless vary substantially at different times in the growing season and from season to season because of differences in growing conditions. For example, the following Table V shows the variation in average Brix value, acid content, and Brix/acid ratio for California Valencia orange juice at different times of the growing season over a period of five years. It will be understood, of course, that when juices such as those represented in Table V are extracted by the present method, a plurality of juice fractions of progressively varying composition are obtained instead of the total juice having average values as shown in the Table. However, the location and extent of the fractions into which the total juice is to be divided will need to be varied from time to time according to the changing composition of the juice, which variation can readily be accomplished by changing the combinations of the outlets.

TABLE V

*California Valencia oranges*

BRIX/ACID RATIOS
[Acid as anhydrous citric acid in grams per 100 grams of juice.]

|  | 1943 Average | | | 1944 Average | | | 1945 Average | | | 1946 Average | | | 1947 Average | | | 1948 Average | | |
| --- | --- | --- | --- | --- | --- | --- | --- | --- | --- | --- | --- | --- | --- | --- | --- | --- | --- | --- |
|  | Brix | A C A | Ratio | Brix | A C A | Ratio | Brix | A C A | Ratio | Brix | A C A | Ratio | Brix | A C A | Ratio | Brix | A C A | Ratio |
| June First Half | 10.37 | 1.10 | 9.43 | 12.30 | 1.30 | 9.46 | 11.71 | 1.40 | 8.36 | 12.23 | 1.39 | 8.80 | 12.30 | 1.33 | 9.24 | 12.10 | 1.49 | 8.12 |
| June Last Half | 10.60 | 1.02 | 10.39 | 11.87 | 1.19 | 9.80 | 12.06 | 1.33 | 9.07 | 12.54 | 1.36 | 9.22 | 12.20 | 1.31 | 9.31 | 12.60 | 1.46 | 8.63 |
| July First Half | 10.80 | 1.02 | 10.59 | 12.11 | 1.14 | 10.62 | 12.19 | 1.26 | 10.67 | 13.54 | 1.32 | 10.26 | 12.00 | 1.24 | 9.68 | 12.80 | 1.37 | 9.34 |
| July Last Half | 11.30 | 1.06 | 10.66 | 12.20 | 1.04 | 11.73 | 12.47 | 1.15 | 10.84 | 13.02 | 1.24 | 10.50 | 12.70 | 1.17 | 10.85 | 13.00 | 1.24 | 10.48 |
| August First Half | 11.50 | .99 | 11.62 | 12.37 | 1.04 | 11.89 | 12.51 | 1.10 | 11.37 | ------ | ------ | ------ | 13.40 | 1.14 | 11.75 | 13.50 | 1.28 | 10.54 |
| August Last Half | 11.90 | 1.00 | 11.90 | 12.69 | 1.01 | 12.56 | 12.66 | 1.09 | 11.61 | ------ | ------ | ------ | 13.70 | 1.17 | 11.70 | 13.90 | 1.30 | 10.69 |
| September First Half | 12.02 | 1.06 | 11.33 | 12.57 | 1.02 | 12.32 | 13.54 | 1.16 | 11.67 | ------ | ------ | ------ | 13.50 | 1.13 | 11.94 | 13.50 | 1.24 | 10.89 |
| September Last Half | 11.71 | .98 | 11.94 | 13.11 | 1.01 | 12.98 | 12.79 | 1.14 | 11.22 | 14.29 | 1.22 | 11.71 | 13.80 | 1.13 | 12.21 | 13.90 | 1.24 | 11.20 |
| October First Half | 11.91 | 1.01 | 11.79 | 13.09 | 1.04 | 12.58 | 13.09 | 1.08 | 12.12 | 13.03 | 1.12 | 11.63 | 13.80 | 1.17 | 11.79 | 13.80 | 1.23 | 11.21 |

Thus all of the juice is utilized, including that which ordinarily would not be acceptable, and at the same time concentrates of substantially uniform Brix/acid ratio can be produced regardless of variations in the composition of the fruit. Furthermore, a desired, predetermined degree of sweetness of the concentrate can be maintained, and concentrates of varying degrees of sweetness can be produced.

The pectinesterase content of the juice can be determined by the method of MacDonnell, L. R., Jansen, E. F., and Lineweaver, H., as described in The Properties of Orange Pectinesterase, Archives of Biochemistry, vol. 6, No. 3, pp. 389–401, May 1945. The tables show that the amount of such pectinesterase in the successive juice fractions also varies progressively, being particularly high in the final juice fractions. The presence of relatively high amounts of this enzyme are not serious if the juice is to be further processed at elevated temperatures which effect destruction of the enzymes, as in the preparation of beverage base and sometimes in the canning of single-strength juice. On the other hand, a serious problem arises when juice containing such high amounts of enzyme is used in the preparation of frozen concentrate, because the evaporation temperatures generally are not high enough to inactivate the enzymes and in any case the "cut back" juice added to the concentrate is not heated. The enzymes, particularly pectinesterase, appear to react with pectin and/or pulp in the concentrate when it is maintained at normal regrigerator temperatures, causing the formation of a gel which is objectionable from the standpoint of both appearance and difficulty of reconstitution. The present invention permits the selection and use for cut-back juice of those fractions containing relatively low proportions of enzymes, such as fractions 4 and 5 of Table I or fractions 3 and 4 of Table II, and also the elimination from the concentrate of the final fractions (e. g., fractions 8 and 9) containing relatively high proportions of the enzymes which can be used in making other citrus juice products.

A similar fractionation can be made on the basis of glucosides and other bitter principles by eliminating the final fractions having a relatively high content of such bitter principles, thus producing juice containing a predetermined maximum amount of bitter principles.

Control of the amount of peel oil flavor in the citrus juice product affords another illustration of the advantages of the invention. For example, excessive peel oil flavor is generally considered undesirable in a frozen orange juice concentrate. In the manufacture of this product, the general practice is to concentrate the juice to a degree greater than that desired in the final product, and then to dilute or "cut back" the concentrate to the desired consistency by the addition of fresh single-strength juice to provide more flavor. Some of the oil in the juice sent to the evaporator is volatilized during concentration, but the "cut-back" juice contains practically all of its original oil content when it is added to the concentrate. Since the initial bending or distortion of the peel results in the release of the oil from the oil glands near the surface of the fruit, which is immediately discharged with considerable force as in the case of twisting a slice of lemon or orange peel, it has been a practice heretofore to use a separate collecting pan for cut-back juice which is located beyond the region of this initial oil discharge. However, the amount of oil in the evaporator feed juice is often too great to be removed effectively at the low evaporation temperatures employed.

The present invention permits the collection of low-oil fractions for use as cut-back juice, as for example the fractions from outlets 3 or 4 of Table II, and also the elimination from the evaporator feed juice of fractions high in oil such as those from outlets 8 and 9 of Table II and, if desired, that from outlet 1 as well. These high oil fractions can be combined and used in making beverage base, since the relatively high temperatures employed in concentrating this product result in volatilization of most of the oil. The fractions of intermediate oil content not used for cut-back juice are concentrated, during which they lose most of their oil, and the concentrate is then combined with the relatively oil-free cut-back juice to make the final product.

It will be understood that the fractionations suggested above may need to be varied according to the composition of the fruit. For example, the yield of oil from somewhat immature fruit is known to be higher than that from fully ripe fruit. With immature fruit, such as may be encountered early in the season, it may therefore be desirable to shift the point at which the cut-back juice is separated, and/or to separate additional high-oil fractions from the evaporator feed juice. Similar variations in the number of fractions and in the selection and use of such fractions will be desirable with variations in the kind, variety and composition of the fruit brought into the plant and in the uses for which the juice is intended.

It will also be understood that while the invention has been described with particular reference to extraction of the juice by means of an extractor of the Citro-Mat type, any other desired type of extractor can be used in which the juice is extracted by progressively increasing compression of the fruit, and the successive juice fractions thus obtained can be separately collected in any desired manner.

Reference therefore should be had to the appended claims for a definition of the limits of the invention.

What is claimed is:

1. A process for the selective extraction from citrus fruit of a plurality of juice fractions containing predetermined different proportions of particular juice constituents which comprises dividing the citrus fruit into sections and passing said parts through an extraction zone while compressing said parts with progressively increasing pressure, whereby the composition of the juice expressed at different points in said zone varies in the proportions of said constituents which it contains, collecting the expressed juice separately from a plurality of fractional portions of said zone to provide a plurality of juice fractions, and varying the extent and location of said fractional portions in conformity with variations in the fruit being extracted to provide juice fractions conforming substantially in composition to said predetermined different proportions.

2. The method defined in claim 1, including the step of blending certain of said juice fractions into a juice having a desired average composition.

3. A process for the selective extraction from citrus fruit of a plurality of juice fractions containing different proportions of at least one juice constituent of the group consisting of sugars, citric acid, glucosides, and pectinesterase which comprises dividing the citrus fruit into parts and compressing said parts with progressively increasing pressure while passing them through an extraction zone, whereby the composition of the juice expressed from the fruit at different points in its travel through said zone varies in its proportion of at least one of said constituents, and collecting said expressed juice separately from a plurality of portions of said zone the location and extent of which are predetermined in conformity with variations in the fruit to provide at least one juice fraction containing a desired proportion of said one constituent.

4. A process for the selective extraction from citrus fruit of a plurality of juice fractions containing predetermined different proportions of at least one juice constituent of the group consisting of sugars, citric acid, glucosides and pectinesterase which comprises dividing the citrus fruit into parts and subjecting said parts to progressively increasing pressure as they travel through an extraction zone, the juice expressed from the fruit at different pressures varying in its content of at least one of said constituents, collecting said expressed juice separately from different portions of said zone, and varying the location and extent of said portions in conformity with variations in the fruit being extracted to provide juice fractions conforming substantially in composition to said predetermined different proportions.

5. A process for the extraction of citrus juice having a predetermined Brix/acid ratio which comprises dividing the citrus juice into parts and passing said parts through an extraction zone while compressing said parts with progressively increasing pressure, whereby the Brix/acid ratio of the juice expressed at successive points in said zone progressively increases, collecting the expressed juice from those portions of said zone in which said Brix/acid ratio conforms substantially to said predetermined value, separately collecting from other portions of said zone at least one fraction having a Brix/acid ratio which differs substantially from said predetermined value, and blending said fraction with other citrus juice in proportions which provide a blend having a Brix/acid ratio which conforms substantially to said predetermined value.

6. A process as defined in claim 5, said fraction having a Brix/acid ratio substantially greater than said predetermined value and being blended with other citrus juice having a Brix/acid ratio less than said predetermined value.

7. A process as defined in claim 5, said fraction having a Brix/acid ratio substantially less than said predetermined value and being blended with other citrus juice having a Brix/acid ratio greater than said predetermined value.

8. A process for the extraction of citrus juice for the manufacture of citrus juice concentrates of the type in which concentrated juice is diluted with single-strength juice to the desired final consistency, said process comprising the steps of dividing citrus fruit into parts and subjecting said parts to progressively increasing pressure while passing through an extraction zone, the amount of peel oil expressed from the fruit being substantial in the initial portion of said zone, then decreasing in the succeeding portion of said zone, and then increasing to a relatively high value in the last portion of said zone, separating juice containing a relatively high amount of oil by collecting the juice fractions from said last portion of said zone, separately collecting a juice fraction of low oil content from said succeeding portion of said zone for use as said single-strength juice, and separately collecting juice fractions for concentration from the other portions of said zone.

9. A process for the extraction of citrus juice and the manufacture of citrus juice concentrates therefrom which comprises dividing citrus fruit into parts and subjecting said parts to progressively increasing pressure while passing through an extraction zone, separately collecting juice fractions of relatively high oil and enzyme content expressed in the last portion of said zone, separately collecting a single-strength juice fraction of low oil content from a portion of said zone preceding said last portion, separately collecting and concentrating juice fractions from the other portions of said zone, and blending said single-strength fraction with the concentrated fractions.

10. A process for the extraction of citrus juice which comprises subjecting the fruit to progressively increasing compression and separately collecting the juice expressed at different stages of compression, the fraction expressed in the stage of greatest compression having a relatively high content of constituents undesirable for beverage purposes, the juice expressed in stages of less compression being collected separately from said fraction and having a relatively low content of such constituents.

11. A process for the extraction of citrus juice containing a predetermined maximum amount of a constituent of the group consisting of pectinesterase, glucosides and peel oil which comprises dividing citrus fruit into parts and subjecting said parts to progressively increasing pressure as they travel through an extraction zone, the amount of said constituent being greater in juice fractions expressed under relatively high pressure in the last portion of said zone than in juice fractions expressed in preceding portions of said zone, separating juice having a relatively high content of said constituent by collecting the juice fractions from the last portion of said zone, and separately collecting from preceding portions of said zone juice having an average content of said constituent not greater than said predetermined maximum.

WILHELM PAUL ARNDT.

REFERENCES CITED

The following references are of record in the file of this patent:

UNITED STATES PATENTS

| Number | Name | Date |
| --- | --- | --- |
| 2,374,047 | Stacom | Apr. 17, 1945 |
| 2,393,475 | McKinnis | Jan. 22, 1946 |